(12) United States Patent
Othmer

(10) Patent No.: US 7,370,283 B2
(45) Date of Patent: May 6, 2008

(54) SYSTEMS AND METHODS FOR POPULATING A TICKER USING MULTIPLE DATA TRANSMISSION MODES

(75) Inventor: Konstantin Othmer, Mountain View, CA (US)

(73) Assignee: Core Mobility, Inc., Mountain View, CA (US)

(*) Notice: Subject to any disclaimer, the term of this patent is extended or adjusted under 35 U.S.C. 154(b) by 52 days.

(21) Appl. No.: 11/061,422

(22) Filed: Feb. 18, 2005

(65) Prior Publication Data

US 2005/0154996 A1     Jul. 14, 2005

Related U.S. Application Data

(63) Continuation-in-part of application No. 10/946,254, filed on Sep. 20, 2004, which is a continuation-in-part of application No. 10/929,000, filed on Aug. 26, 2004, which is a continuation-in-part of application No. 10/917,200, filed on Aug. 11, 2004, and a continuation-in-part of application No. 10/916,960, filed on Aug. 11, 2004.

(60) Provisional application No. 60/494,644, filed on Aug. 11, 2003.

(51) Int. Cl.
*G06F 3/00* (2006.01)
*G06F 15/173* (2006.01)

(52) U.S. Cl. ............... 715/774; 715/733; 715/764; 715/781; 709/218

(58) Field of Classification Search ............ 715/501.1, 715/733, 738, 740, 744–749, 764–765, 774, 715/781, 784, 786, 789; 709/201, 203, 204, 709/217–219, 230, 231, 238; 719/315
See application file for complete search history.

(56) References Cited

U.S. PATENT DOCUMENTS 3,824,597 A * 7/1974 Berg .......................... 370/215

(Continued)

FOREIGN PATENT DOCUMENTS

| EP | 1195949 A2 | 10/2002 |
|----|-----------|---------|
| JP | 409311997 A1 | 12/1997 |

OTHER PUBLICATIONS

U.S. Appl. No. 11/128,649, filed May 13, 2005, Othmer.

(Continued)

*Primary Examiner*—X. L. Bautista
(74) *Attorney, Agent, or Firm*—Workman Nydegger

(57) ABSTRACT

Content to be presented on a ticker of a communication device is conveyed by being transmitted using one or more transmission modes that are intelligently selected according to various criteria. The mode is chosen from among a plurality of transmission modes available, such as Bluetooth, WiFi, WiMAX or other 802.11 wireless networks; AM or FM radio waves; paging networks; paging channels on cellular or PCS networks; SMS transmissions; and vertical blanking interrupts on TV transmissions. Selection of the transmission mode is based in part upon at least one consideration, such as: content size, type or subject matter; user preferences; location of the communication device; available bandwidth; current network loads; time of day; the number of other users receiving the same content, and; transmission cost. Once the mode is selected, content is transmitted to the communication device and presented in a ticker of the device.

28 Claims, 7 Drawing Sheets

U.S. PATENT DOCUMENTS

| | | |
|---|---|---|
| 5,321,750 A | 6/1994 | Nadan |
| 5,875,232 A | 2/1999 | Wolf ........................ 379/88.19 |
| 5,875,240 A | 2/1999 | Silverman .............. 379/142.07 |
| 5,959,621 A | 9/1999 | Nawaz et al. |
| 6,016,307 A | 1/2000 | Kaplan et al. ............... 370/238 |
| 6,028,842 A | 2/2000 | Chapman et al. ............ 370/235 |
| 6,085,148 A * | 7/2000 | Jamison et al. .............. 701/211 |
| 6,091,956 A * | 7/2000 | Hollenberg .............. 455/456.5 |
| 6,138,162 A | 10/2000 | Pistriotto et al. ............ 709/229 |
| 6,144,641 A | 11/2000 | Kaplan et al. ............... 370/238 |
| 6,151,030 A | 11/2000 | DeLeeuw et al. |
| 6,157,614 A | 12/2000 | Pasternak et al. ............ 370/236 |
| 6,157,935 A | 12/2000 | Tran et al. |
| 6,173,311 B1 | 1/2001 | Hassett et al. ............... 709/202 |
| 6,181,780 B1 | 1/2001 | Finnigan .................... 379/67.1 |
| 6,216,006 B1 | 4/2001 | Scholefield et al. ......... 455/450 |
| 6,219,341 B1 | 4/2001 | Varanasi ..................... 370/252 |
| 6,240,361 B1 | 5/2001 | Ise et al. |
| 6,285,658 B1 | 9/2001 | Packer ........................ 370/230 |
| 6,292,799 B1 | 9/2001 | Peek et al. ..................... 707/10 |
| 6,300,875 B1 * | 10/2001 | Schafer .................... 340/573.1 |
| 6,310,889 B1 | 10/2001 | Parsons et al. .............. 370/466 |
| 6,324,184 B1 | 11/2001 | Hou et al. ................... 370/468 |
| 6,324,271 B1 | 11/2001 | Sawyer et al. .......... 379/142.05 |
| 6,385,449 B2 | 5/2002 | Eriksson et al. ............. 455/436 |
| 6,397,059 B1 | 5/2002 | Vance et al. ................. 455/415 |
| 6,401,238 B1 | 6/2002 | Brown et al. ................ 717/177 |
| 6,421,694 B1 * | 7/2002 | Nawaz et al. ................ 715/526 |
| 6,453,351 B1 | 9/2002 | Endo .......................... 709/229 |
| 6,456,594 B1 | 9/2002 | Kaplan et al. ............... 370/238 |
| 6,473,404 B1 | 10/2002 | Kaplan et al. ............... 370/238 |
| 6,477,707 B1 | 11/2002 | King et al. |
| 6,522,875 B1 * | 2/2003 | Dowling et al. .......... 455/414.3 |
| 6,536,041 B1 | 3/2003 | Knudson et al. |
| 6,538,880 B1 | 3/2003 | Kamijo et al. |
| 6,594,483 B2 * | 7/2003 | Nykanen et al. ............. 455/411 |
| 6,640,239 B1 | 10/2003 | Gidwani |
| 6,668,353 B1 * | 12/2003 | Yurkovic .................. 715/501.1 |
| 6,675,350 B1 * | 1/2004 | Abrams et al. ........... 715/501.1 |
| 6,727,930 B2 | 4/2004 | Currans et al. |
| 6,731,238 B2 * | 5/2004 | Johnson ................. 342/357.09 |
| 6,742,042 B1 | 5/2004 | Holden et al. |
| 6,757,718 B1 | 6/2004 | Halverson et al. |
| 6,771,290 B1 * | 8/2004 | Hoyle ......................... 715/745 |
| 6,788,314 B1 | 9/2004 | Freiberger et al. |
| 6,966,028 B1 | 11/2005 | Beebe |
| 7,013,149 B2 | 3/2006 | Vetro et al. |
| 7,039,684 B2 | 5/2006 | Blockton et al. |
| 7,167,728 B1 | 1/2007 | Wagner et al. |
| 2001/0013068 A1 | 8/2001 | Klemets et al. |
| 2001/0051998 A1 | 12/2001 | Henderson |
| 2001/0056443 A1 | 12/2001 | Takayama et al. |
| 2002/0004755 A1 | 1/2002 | Balthaser |
| 2002/0094826 A1 | 7/2002 | Lee |
| 2002/0103781 A1 * | 8/2002 | Mori et al. ...................... 707/1 |
| 2002/0145666 A1 * | 10/2002 | Scaman et al. .............. 348/148 |
| 2002/0151313 A1 | 10/2002 | Stead |
| 2002/0163938 A1 | 11/2002 | Tuomainen et al. |
| 2002/0171691 A1 * | 11/2002 | Currans et al. .............. 345/864 |
| 2002/0193095 A1 | 12/2002 | Hutcheson et al. |
| 2002/0194049 A1 | 12/2002 | Boyd |
| 2002/0194601 A1 * | 12/2002 | Perkes et al. .................. 725/44 |
| 2003/0026231 A1 | 2/2003 | Lazaridis et al. |
| 2003/0032404 A1 | 2/2003 | Wager et al. |
| 2003/0045245 A1 | 3/2003 | Hikishima |
| 2003/0063128 A1 | 4/2003 | Salmimaa et al. |
| 2003/0069693 A1 * | 4/2003 | Snapp et al. ................. 701/213 |
| 2003/0093495 A1 | 5/2003 | McNulty et al. |
| 2003/0135582 A1 * | 7/2003 | Allen et al. .................. 709/217 |
| 2003/0142129 A1 | 7/2003 | Kleven et al. |
| 2003/0164779 A1 * | 9/2003 | Gleseke et al. .............. 340/993 |
| 2003/0164862 A1 | 9/2003 | Cadiz et al. |
| 2003/0167467 A1 | 9/2003 | Allen et al. |
| 2003/0171985 A1 * | 9/2003 | Prabhu et al. ................. 705/14 |
| 2003/0181228 A1 | 9/2003 | Kim |
| 2003/0189557 A1 | 10/2003 | Takagi et al. |
| 2003/0226152 A1 * | 12/2003 | Billmaier et al. ............ 725/135 |
| 2004/0003402 A1 * | 1/2004 | McKenna ...................... 725/46 |
| 2004/0059826 A1 | 3/2004 | Gould et al. |
| 2004/0067769 A1 | 4/2004 | King et al. |
| 2004/0073924 A1 * | 4/2004 | Pendakur ....................... 725/46 |
| 2004/0078104 A1 | 4/2004 | Nguyen et al. |
| 2004/0078814 A1 | 4/2004 | Allen |
| 2004/0101274 A1 | 5/2004 | Foisy et al. |
| 2004/0133655 A1 * | 7/2004 | Yen et al. .................... 709/218 |
| 2004/0143636 A1 * | 7/2004 | Horvitz et al. .............. 709/207 |
| 2004/0186733 A1 | 9/2004 | Loomis |
| 2004/0192336 A1 | 9/2004 | Walby |
| 2004/0196265 A1 * | 10/2004 | Nohr ........................... 345/169 |
| 2004/0203512 A1 | 10/2004 | Ho et al. |
| 2004/0203851 A1 * | 10/2004 | Vetro et al. ............... 455/456.1 |
| 2004/0204122 A1 | 10/2004 | Opela et al. |
| 2004/0233160 A1 | 11/2004 | Chincholle et al. |
| 2005/0005242 A1 | 1/2005 | Hoyle |
| 2005/0022114 A1 * | 1/2005 | Shanahan et al. ............ 715/513 |
| 2005/0032527 A1 | 2/2005 | Sheha et al. |
| 2005/0039135 A1 | 2/2005 | Othmer et al. |
| 2005/0039136 A1 | 2/2005 | Othmer et al. |
| 2005/0125375 A1 | 6/2005 | Lee et al. |
| 2005/0140504 A1 | 6/2005 | Marshall et al. |
| 2006/0022048 A1 | 2/2006 | Johnson |
| 2006/0133307 A1 | 6/2006 | Fukasawa et al. |
| 2006/0179415 A1 * | 8/2006 | Cadiz et al. ................. 715/838 |
| 2006/0219780 A1 * | 10/2006 | Swartz et al. ............... 235/383 |
| 2006/0229065 A1 | 10/2006 | Lazaridis et al. |

OTHER PUBLICATIONS

U.S. Appl. No. 11/298,818, filed Dec. 9, 2005, Othmer.
U.S. Appl. No. 11/426,294, filed Jun. 23, 2006, Othmer et al.
U.S. Appl. No. 11/426,295, filed Jun. 23, 2006, Othmer et al.
A. Catovic et al, "Geolocation updating schemes for location aware services in wireless networks", 2001, IEEE, vol. 1, pp. 378-382.
G. Bieber et al, "XyberScout: a platform for the efficient construction of mobile location aware information systems", Jan. 2003, IEEE.
"SCE Stuents' Applications Won Motorola's Buddy Finder Competition", http://www.ntu.edu.sg/sce/achieves-sch2003-05.asp#2003-11-3;2003.
http://communications.georgetown.edu/rss.html; Georgetown University—Newroom—RSS Feeds, 1999-2003.
U.S. Appl. No. 10/916,960, filed Oct. 29, 2007, Office Action.
U.S. Appl. No. 10/929,000, filed Oct. 31, 2007, Office Action.
U.S. Appl. No. 10/916,960, filed Aug. 11, 2004, Othmer et al., Patent Application.
U.S. Appl. No. 10/917,200, filed Aug. 11, 2004, Othmer et al., Patent Application.
Notice of Allowance mailed Jul. 12, 2007 for U.S. Appl. No. 10/929,000.
Office Action mailed Jul. 27, 2007 for U.S. Appl. No. 10/916,960.
Office Action mailed Mar. 22, 2007 for U.S. Appl. No. 10/916,960.
Office Action mailed Dec. 14, 2006 for U.S. Appl. No. 10/916,960.
Office Action mailed Mar. 14, 2006 for U.S. Appl. No. 10/916,960.
Office Action mailed Mar. 22, 2007 for U.S. Appl. No. 10/929,000.
Office Action mailed Dec. 19, 2006 for U.S. Appl. No. 10/929,000.
Office Action mailed Mar. 24, 2006 for U.S. Appl. No. 10/929,000.
Office Action mailed Jul. 5, 2007 for U.S. Appl. No. 11/128,649.

Office Action mailed Sep. 7, 2007 for U.S. Appl. No. 10/946,254.
Office Action mailed Nov. 1, 2006 for U.S. Appl. No. 10/946,254.
Office Action mailed Mar. 24, 2006 for U.S. Appl. No. 10/946,254.
Office Action mailed Sep. 4, 2007 for U.S. Appl. No. 11/298,818.
Office Action mailed Apr. 19, 2007 for U.S. Appl. No. 11/298,818.
Office Action mailed Sep. 19, 2007 for U.S. Appl. No. 11/426,295.
Notice of Allowance mailed Mar. 27, 2007 for U.S. Appl. No. 10/946,254.

S. Kinoshita et al., "RealPush Network: A New Push-Type Content Delivery System Using Reliable and Flexible Browser", 1998, IEEE, pp. 188-189.

NTT, "NTT Develops RealPush Network", Dec. 19, 1997, News Release, 3 pages.

* cited by examiner

SYSTEMS AND METHODS FOR POPULATING A TICKER USING MULTIPLE DATA TRANSMISSION MODES

RELATED APPLICATIONS

This application is a continuation-in-part of U.S. patent application Ser. No. 10/946,254, filed Sep. 20, 2004, which is a continuation-in-part of U.S. patent application Ser. No. 10/929,000, filed Aug. 26, 2004. U.S. patent application Ser. No. 10/929,000, filed Aug. 26, 2004, is a continuation-in-part of U.S. patent application Ser. No. 10/917,200, filed Aug. 11, 2004, and is a continuation-in-part of U.S. patent application Ser. No. 10/916,960, filed Aug. 11, 2004, both of which claim the benefit of U.S. Provisional Patent Application Ser. No. 60/494,644, filed Aug. 11, 2003. The foregoing patent applications are incorporated herein by reference.

BACKGROUND OF THE INVENTION

1. Field of the Invention

The present invention relates generally to communications systems, methods and devices. More particularly, exemplary embodiments of the invention concern systems and methods directed to selecting the optimal mode or modes to transmit data to the ticker of a communication device.

2. Related Technology

The popularity of the Internet has given rise to a consumer demand for uninterrupted access to information. To accommodate the consumer demand, a plethora of information services have been developed to cater to consumers accustomed to accessing timely, personalized news and information. An example of an information service developed to cater to consumer desire for access to news and information is scrolling information displays. Scrolling information displays, referred to herein as "tickers," are one type of content display mechanism that can give a viewer a quick, high-level update of news and information. Therefore, tickers have become commonplace on television news and sports programs, providing viewers with "at-a-glance" headlines, breaking news, weather reports, sports scores and other updates.

Not only do tickers provide at-a-glance updates during television programs, tickers also serve as information displays on computers and other electronic devices. One early example of a ticker on a personal computer (PC) system is the ticker provided by Pointcast. Through the Pointcast service, PC users could subscribe to news and information channels of interest and receive periodic updates on their computer displays, often in the form of a scrolling information display at the bottom of the user's display screen. An even earlier example of the use of tickers in conjunction with a PC was the ticker provided by gaming company Catapult Entertainment, Inc. In addition to providing users with gaming-related information, the Catapult ticker was also interactive through the use of the computer mouse. Rather than being limited to the information in the ticker, the user could use the mouse to click on an item in the ticker having a Universal Resource Identifier (URI) associated with the item, which would then cause a web page to be displayed with additional information about that item.

More recently, through the use of messaging systems with near-universal reach such as the Short Message Service (SMS), mobile workers can now receive up-to-the-minute business, financial and customer information on their mobile devices. Ticker information is supplied through various news and entertainment content providers and from other information sources, including corporate portals and customer relationship management applications. Furthermore, tickers are beginning to appear as a method for dynamic information display on mobile communication devices, such as cellular telephones, personal digital assistants (PDAs), and "smart" phones.

While the value of receiving personalized, timely information in a condensed, quickly-read format such as a ticker is indisputable, the information tickers known in the art could be significantly improved. One area for improvement concerns data transmission modes. Currently, content can be transmitted to a communication device using any of a number of data transmission modes, including, but not limited to, cellular networks, internet protocol (IP) networks such as the Internet, the Short Message Service (SMS), satellite and terrestrial radio broadcasts, the 802.11 family of wireless local area networks, and Bluetooth networks.

Since it is likely that providers will transmit content of varying sizes and data types via numerous delivery mechanisms in order to deliver content to a device and populate its ticker, it would be valuable to both the communication device user and to the content provider to be able to selectively transmit content over multiple data transmission modes. In exemplary embodiments of the invention, optimal data transmission modes can be selected based on the characteristics of the content to be transmitted and other considerations, such as network traffic loads. Selectively transmitting content for display on a ticker over multiple data transmission modes would improve efficiency in transmitting data; while at the same time allow content providers and communication device users greater flexibility in transmitting data. Greater flexibility and efficiency in data transmission would also enhance user accessibility to content.

BRIEF SUMMARY OF AN EXEMPLARY EMBODIMENT OF THE INVENTION

In general, exemplary embodiments of the invention concern systems and methods for employing multiple data transmission modes to deliver content that will populate a ticker on a communication device. Optimal transmission modes for transmitting content are determined based on a variety of considerations. Considerations include characteristics of the content to be transmitted, capabilities of the communication device, characteristics of the networks used to transmit, and the geographical location of the communication device. Additional considerations include finding a transmission mode that is cost efficient while at the same time capable of preserving bandwidth, and considerate of current network traffic loads.

In an exemplary embodiment, a communication device is equipped to receive content on a variety of network types, such as wireless networks and terrestrial broadcast networks. The communication device is also equipped with ticker client software that enables a ticker to be rendered on the display of the communication device. Based on considerations such as available network connections, the location of the mobile communication device, user preferences, content presentation rules, or any combination of these or other considerations, the ticker on the communication device periodically receives content. Moreover, according to considerations such as the capabilities of the communication device, the traffic load on a particular network, and the size, type and priority of the data transmission intended for the ticker of the communication device, one transmission mode may be selected over another itransmission mode. A variety of transmission modes may be considered, including: paging networks; paging channels on cellular or Personal Communications Services (PCS) networks; SMS transmissions; AM or FM radio waves; traffic channels on cellular or PCS networks; vertical blanking interrupts on TV transmission; satellite transmission; and wireless networks such as Bluetooth, WiMAX, WiFi, and other 802.11 protocols. Selection of an appropriate transmission mode optimally utilizes available network resources and transmits content to the ticker of the communication device in a way that is cost efficient and may conserve bandwidth. Furthermore, any of a number of content delivery mechanisms that operate in conjunction with data transmission modes may be used to deliver content to the ticker, including multimedia messaging service (MMS), really simple syndication (RSS), SMS, email, pager, and many other content delivery mechanisms.

In an exemplary embodiment, the communication device user subscribes to a ticker service of the invention and indicates preferences for categories of content by inputting the preference via a user interface element on the communication device or an associated website. The preferences are then stored in the system for future reference by the system. As a result, content relating to the preferences indicated by the user are transmitted to the communication device as the content becomes available. In this way, content is aggregated on the server before being transmitted to, and presented on, the ticker of the communication device. After the content is received by the ticker client software, a scheduling system determines the timing, order, and frequency with which the content will be presented in the ticker relative to the other content received, while taking into account user preferences. In some embodiments, content may be transmitted directly to a communication device without having first been aggregated at the ticker server.

Content characteristics such as size and format are considered when determining the optimal mode to transmit the data. Based on the particular characteristics of content, which may include a large size and format, the ticker server determines an appropriate mode by which the content will be transmitted. In addition to having a large size and format, certain types of content may require a secure transmission. When the need for a secure transmission arises, the ticker server recognizes the security requirements associated with the content and the ticker server and transmits the content to the client ticker software using a secure transmission mode.

Usefully, content can be obtained from multiple content sources over any number of networks or bearers, depending on the configuration of the device. As the user changes location, a cell phone equipped to communicate with a cellular telephone system and to sense both Bluetooth and 802.11 networks may obtain stock quotes via an SMS text message (either point-to-point or broadcast), baseball player videos via 802.11, other terrestrial radio broadcasts, or satellite, and a discount coupon from a retailer as the user shops via a Bluetooth wireless access point.

As noted previously, the source of the content and/or the user's proximity to the source of the content are examples of variables employed by the scheduling system to determine when and how content is presented in the ticker.

In this manner, the systems and methods of the invention can populate a ticker on a communication device with content by transmitting the content to the device via the most optimal bearer or bearers, with reference to considerations such as network load, content type, user rules and preferences, and the device's capabilities. This represents a significant improvement over conventional ticker systems, which fail to take into account considerations such as the characteristics, the priority and time sensitivity of the content, the location of the device, the preferences of the device user, and network bandwidth.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Figure 1:
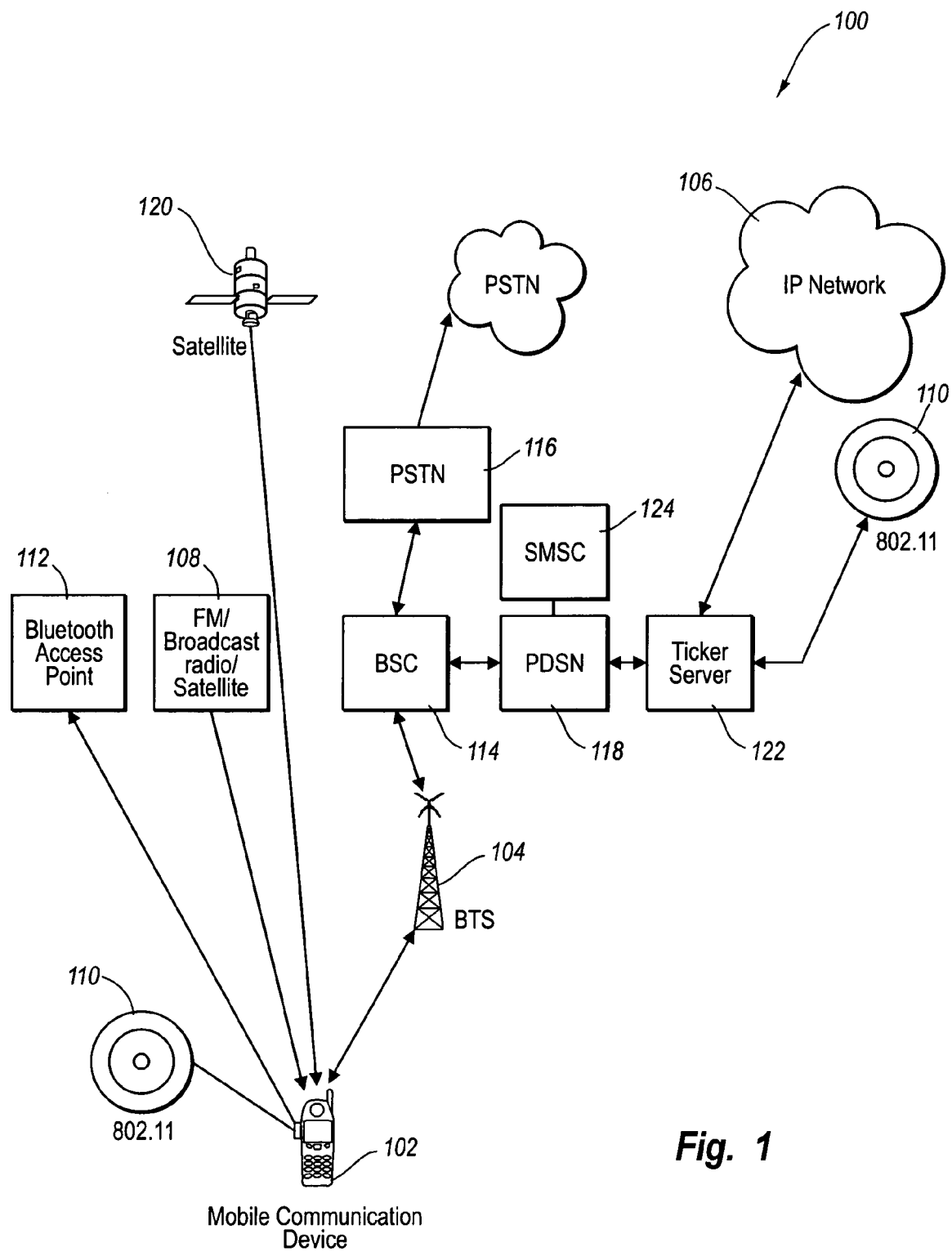
FIG. 1 is a schematic view illustrating aspects of an exemplary operating environment for embodiments of the invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, exemplary embodiments of the invention are concerned with systems and methods for selecting the optimal data transmission mode or modes to transmit content to a personal communication device, for the purpose of populating a ticker on the device. The system selects the most appropriate network connection or "bearer" based on content characteristics, such as the timing, order, frequency and presentation attributes of the content. The optimal transmission mode is chosen from among available bearers, such as: paging networks; paging channel on cellular or Personal Communications Services (PCS) networks; SMS transmissions; AM or FM radio waves; traffic channels on cellular or PCS networks; vertical blanking interrupts on TV transmission; satellite transmissions; and wireless networks including Bluetooth, WiMAX, WiFi and other 802.11 technologies. The term "ticker" refers to a portion of a display screen, or to another format, on a communication device in which information is dynamically displayed, or otherwise relayed or presented to the user. The ticker should not be construed to be limited to the commonly-known scrolling information display that often appears at the bottom of a display screen. Rather, the ticker can take many shapes and forms, and the location of the ticker on the communication device, as well as many other ticker characteristics, can be customized to suit the needs and preferences of the user. Content that may be transmitted in conjunction with the invention includes text, audio, video, graphics, and tactile (such as a vibration) content and other content. The display mode may be a scrolling ticker or other portion of the screen such as a window.

Communication devices that may be employed in conjunction with the invention include PCs, set top boxes, televisions, landline telephones, cellular telephones, PDAs, laptop computers and any other device having a presentation mechanism or an associated presentation mechanism and suitably equipped to establish communication with a network. In particular, exemplary embodiments of the invention are directed to the use of mobile communication devices. However, exemplary embodiments of the invention should not be construed to be limited to the use of mobile communication devices. In addition, the location of the communication device is one of many variables that may be used in the scheduling algorithm employed by the scheduling system of the invention to determine when and how received content is displayed, or otherwise presented, in the ticker.

Embodiments of the invention contemplate content gateways through which some content providers make content available to users of the location-based ticker service. A content gateway provides a way for potentially disparate content servers to interface with the ticker system. Content providers, such as vendors with products and services to advertise, may register with the ticker system. By registering with the ticker system, content providers input marketing and advertising campaigns into the content gateways to promote goods or services to users of the system. Methods of the invention allow users to subscribe to the ticker service of the invention, express preferences for certain types of content to be transmitted through the ticker system, and block other types of content which the user does not want displayed on the ticker of the communication device. Filtering services, which reside on the communication device and prevent unwanted content from being displayed on the ticker of the communication device, manage transmission and reception of content on the communication device in accordance with user preferences. Depending on the metadata and other rules associated with the transmitted content, the content may then be scheduled for display within the ticker on the communication device.

In order to schedule the display of the content on the ticker, exemplary embodiments of the invention provide for a scheduling mechanism that employs a scoring algorithm to, among other things, reconcile the display rules of content competing for display time in the ticker and to determine which content is displayed within the ticker, at what time, in what order, with what frequency and using which display attributes. Other scheduling algorithms could be used as well. Furthermore, the manner in which the transmitted content is displayed can include a wide variety of content display attributes, including the shape, size, speed and location on the display screen of the ticker, multiple font effects, and audible or tactile notifications indicating that new content has arrived at the ticker. Finally, the methods of the invention provide an accounting system to track and report activities associated with ticker usage.

I. Operating Environments and Associated Devices

With particular attention now to FIG. 1, an exemplary embodiment of an operating environment 100 is shown. Although this exemplary operating environment comprises multiple types of networks, including a cellular telephone network, 802.11 networks, Bluetooth access points, and broadcast networks such as FM radio or satellite radio, the invention may be employed in connection with any other type of network and associated devices that are effective in implementing or facilitating wireless communication and/or landline communication. While FIG. 1 depicts a cellular telephone, and while exemplary embodiments are directed to the use of cellular telephones in conjunction with the invention, the invention should not be construed to be limited to such devices. For example, PCs, set top boxes, televisions, landline telephones, cellular telephones, PDAs, laptop computers and any other device suitably equipped to establish communication with a network and having a display device or associated with a display device may be used to implement the methods of the invention. Accordingly, the scope of the invention should not be construed to be limited to the exemplary operating environment 100 of FIG. 1.

As shown in FIG. 1, the operating environment 100 includes one or more communication devices 102 configured to communicate with one or more networks and/or network elements, including base transceiver station (BTS) 104 of a cellular network, internet protocol (IP) network 106, FM, terrestrial, or satellite radio broadcast network 108, 802.11 networks 110, and Bluetooth access point 112. In addition, BTS 104 may be configured to use a base station controller (BSC) 114 to communicate with public switched telephone network (PSTN) 116 and packet data serving node (PDSN) 118. The BSC 114 is a component of a mobile network that contains all the logic used to control the operations of the BTS 104 and acts as an interface between the BTS 104, and the PSTN 116 and PDSN 118. PSTN 116 refers to regular land-line telephone systems, while PDSN 118 refers to the interface to a packet data network.

The geographical location of mobile communication device 102 can be determined using positioning systems and techniques such as a global positioning system (GPS) or wireless-assisted GPS, which uses one or more satellites 120. The location of communication device 102 may also be determined by other methods, such as by triangulation of the signal from the cell sites serving the communication device 102. The location of communication device 102 may also be determined when the communication device 102 encounters an 802.11 network access point or a Bluetooth access point. The location of the communication device 102 is effectively determined by referencing the access point that the communication device 102 encountered because in order to encounter the access point, the communication device 102 must be within a certain distance of the access point.

Alternatively, the device location may be determined by querying another server on the network that contains location information about communication device 102. The device user may explicitly specify the location of landline devices by submitting an information profile to the location-based ticker service. Although some exemplary embodiments of the invention involve transmitting and/or displaying content on a communication device based on the geographical location of the communication device, the invention should not be construed to be limited to transmitting and/or displaying content based on geographical location of a communication device. Rather the location of the communication device is just one of many variables that may be used in the scheduling algorithm employed by the scheduling system of the invention to determine when and how received content is displayed in the ticker.

In addition to being configured to transmit and/or display content in the communication device based on geographical location, communication device 102 is further configured with ticker client software that, in one exemplary embodiment, enables the communication device 102 to render a ticker on the display screen of the communication device. Furthermore, the ticker client software enables the communication device 102 to communicate with ticker server 122, shown in one embodiment as a server operating in conjunction with IP network 106. Ticker server 122 may further interface with other network elements, such as a Short Message Service Center (SMSC) 124 and various gateways to implement the methods of the invention. Moreover, ticker client software is configured to allow the user of the communication device to save content received in the communication device and/or to forward content to other communication devices.

As well, some implementations of the ticker client software enable the user to forward received content to another user, or users with compatible devices and software. Additionally, embodiments of the ticker client software are configured, in some cases at least, to specify various third parties, in addition to the user, that are to receive the desired content. In still other cases, a user may specify that others receive the desired content, even though the user itself may not receive the content. Thus, a user could "bounce" content that was intended for the user, to another party.

II. Receiving and Displaying Content in the Ticker

Figure 2:
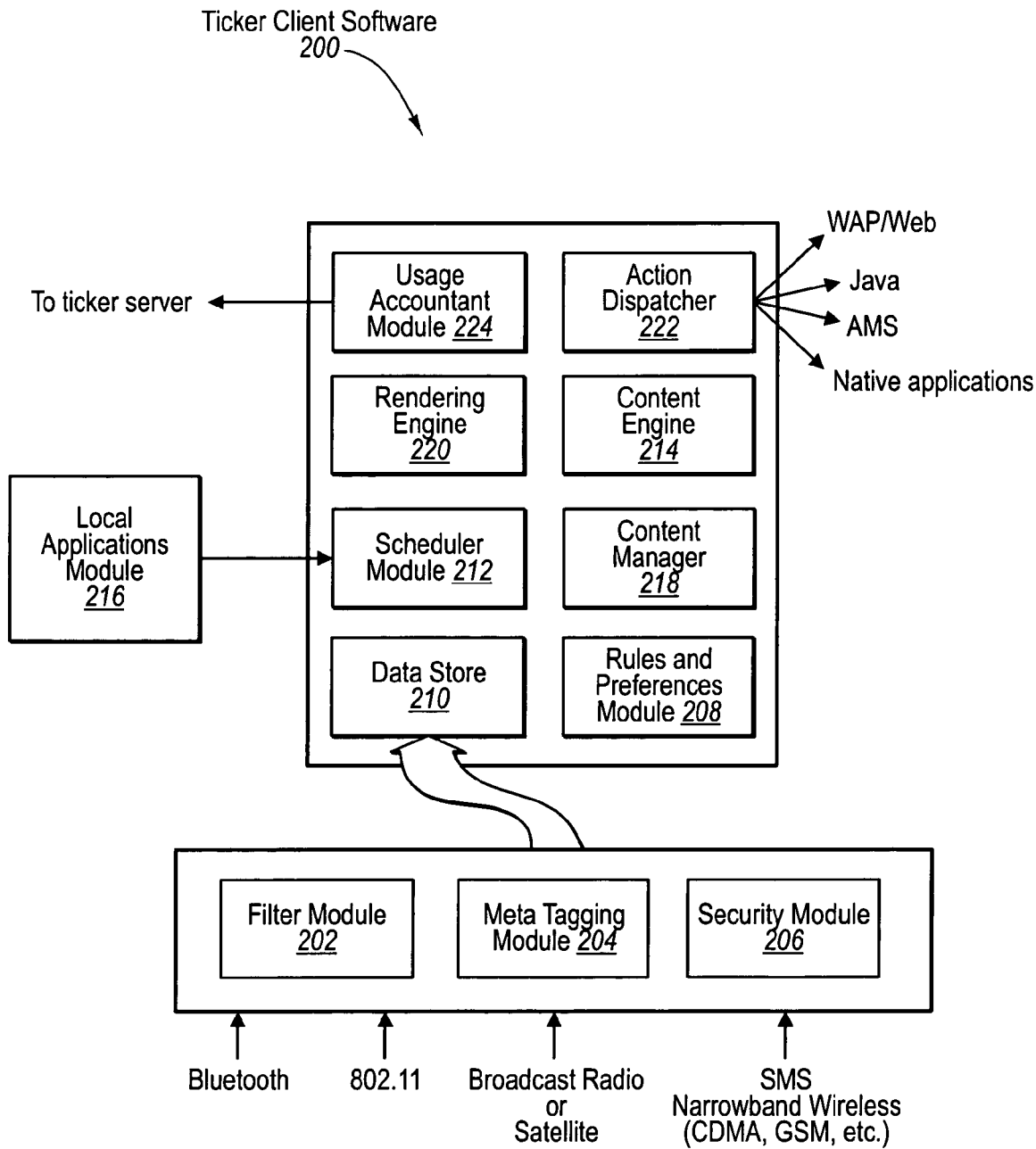
FIG. 2 is a schematic view illustrating aspects of ticker client software.
Figure 3:
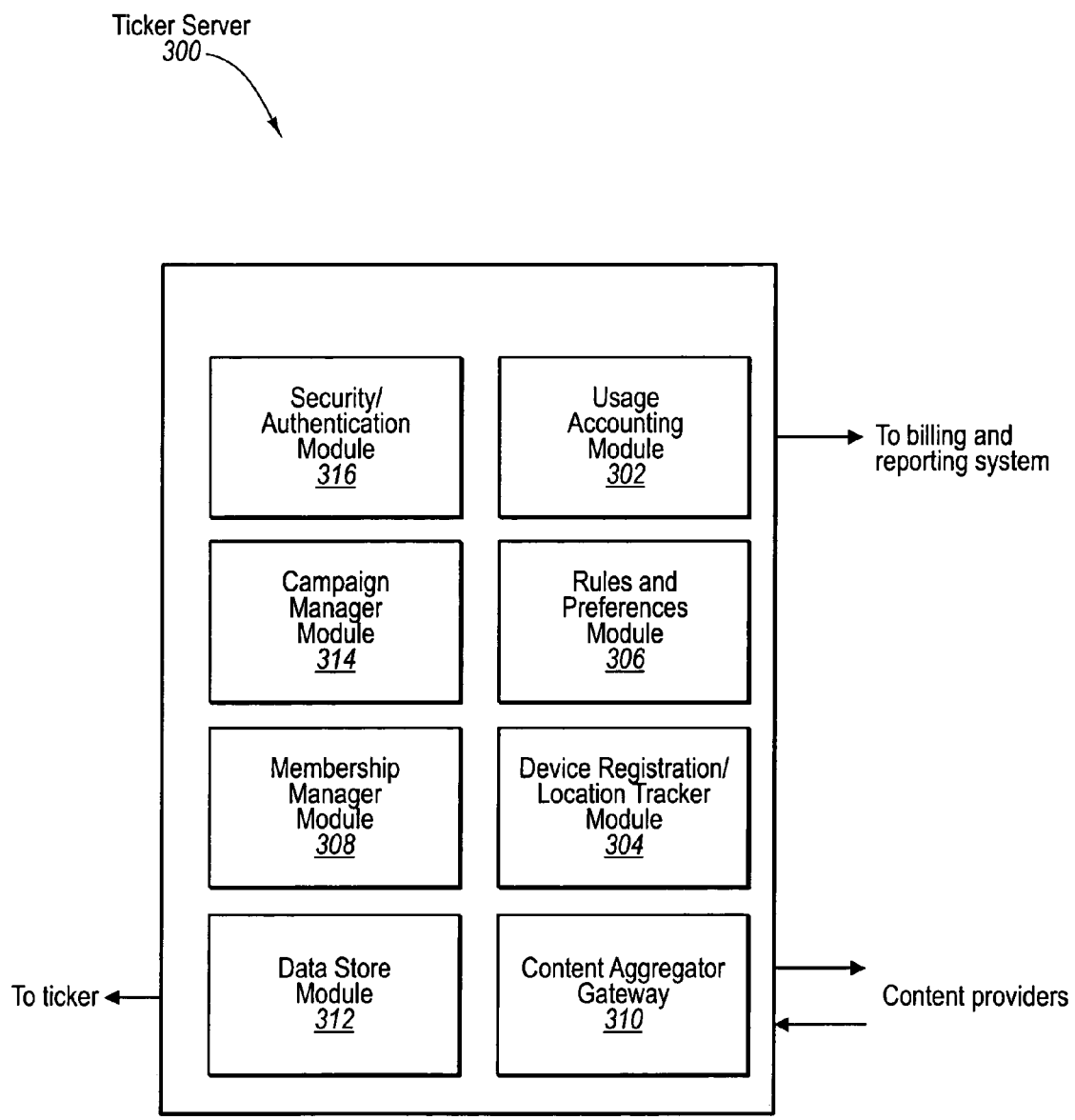
FIG. 3 is a schematic view of an exemplary implementation of a ticker server.

Directing attention now to FIGS. 2 and 3, details are provided concerning an exemplary embodiment of ticker client software 200 and ticker server 300. Generally, ticker client software 200 resides on various types of communication devices such as those noted above in conjunction with FIG. 1. In an exemplary embodiment, ticker client software 200 is installed on communication device 102 of FIG. 1, which is suitably equipped to establish a connection with, and receive content from, IP network 106, FM broadcast radio and satellite networks 108, 802.11 network 110, and Bluetooth network 112 of FIG. 1. Ticker client software 200 operates in conjunction with ticker server 300, and therefore certain aspects of FIG. 3 are discussed in conjunction with the discussion of FIG. 2 below.

Exemplary ticker client software includes filter module 202, meta tagging module 204 and security module 206. When content becomes available from a source that is external to ticker client software 200, filter module 202 evaluates the content to determine if the content should be received for use by the ticker. Filter module 202 also evaluates content to ensure that harmful content, such as content containing viruses, is not received. Security module 206 further examines the available content to ensure the content is from a credible source. If filter module 202 decides, based on information contained in rules and preferences module 208, that the content should be received, and security module 206 further endorses receipt of the content, meta tagging module 204 may associate metadata with the content. Metadata associated with the content by meta tagging module 204 describes the attributes of the content being received and could include, for example, the time of receipt, the location of the device at the time the content was received, and the bearer of the content. The metadata added by meta tagging module 204 may be in addition to metadata already associated with the content by the content provider. The content is then received into data store module 210 and indexed in data store module 210 according to the attributes of the content.

The aforementioned information contained in rules and preferences module 208 is specified by the user, upon registration and/or subscription with the ticker service or via a preferences control panel, to assist in controlling and managing receipt and presentation of content within the ticker. Among other things, the user can express preferences for certain types of content or the user may block receipt of certain types of content or content sources. The user can further specify preferences for the form taken by the ticker, such as the shape, size, and location of the ticker on the display of communication device 102. Information contained in rules and preferences module 208 can be modified by the user at any time. In addition, the ticker service can modify the information that is displayed, or otherwise displayed, at the communication device 102 of the user, based on a history of ticker items the user has previously interacted with, thus inferring the preferences of the user. The history of the ticker activity, the explicit user preferences and rules, and criteria other than geographic location, are referred to herein collectively as "user criteria," which can be used to filter incoming location-based content and to determine whether and when to display the content on the ticker, or more generally, how to process content.

Once the content is received into data store module 210, scheduler module 212 determines the time at which the content will be displayed on the ticker relative to all of the content received and scheduled for display within the ticker. In some embodiments, content may be displayed immediately after the content is received into data store 210, based on the knowledge of ticker server 300, see FIG. 3, of the device location or other parameters. In the embodiment shown in FIG. 2, content engine 214 of ticker client software 200 is responsible for periodically checking the location of the communication device 102 and then interfacing with data store module 210 to search for matches between the current location of the communication device 102 and available content. In still other embodiments, the immediacy of an encounter between a WLAN (wireless local area network) and the communication device 102 causes content to be received at communication device 102 and presented within the ticker. In exemplary embodiments, scheduler module 212 is responsible for determining the timing and order in which all of the content determined to be suitable for presentation is presented in the ticker of communication device 102.

In addition to content received from sources external to the communication device 102, local applications module 216 operating on the communication device 102 can also generate content and submit it to scheduler module 212 to be scheduled for display within the ticker. For example, a calendar application may send an appointment alert to scheduler module 212 for display within the ticker. The scheduler module 212 is able to take into account the time sensitivity of the content and schedule the display of the content within the ticker accordingly.

With continuing attention to FIG. 2, content manager 218 interfaces with data store module 210 to manage the ticker content. For example, the content manager 218 keeps only the latest version of content and deletes previous versions. Content manager 218 also deletes old or expired content or content that the user has previously viewed and that should be deleted based on rules contained in rules and preferences module 208. In one example, a news alert about a particular event may be stored in data store module 210 and scheduled by scheduler module 212 for display in the ticker at a particular time. If updated content is subsequently received in data store module 210, content manager 218 ensures that the most recent news alert is displayed on the ticker in place of the older content already scheduled for display on the ticker.

While content manager 218 manages content to be displayed on the ticker of communication device 102, rendering engine 220 of ticker client software 200 receives input from rules and preferences module 208 concerning the look and feel of the content to be presented on the ticker of communication device 102. For example, the user may want the content to appear in the "traditional" ticker format, wherein the content scrolls horizontally across the bottom of the display screen. Alternatively, the user may wish to view the location-based content as a rotating, three-dimensional box, with each face of the box showing a different category of location-based content. The ticker may display special attributes such as transparency, which allows the user to see through the ticker to what is displayed behind the ticker. The user may further specify that certain categories of location-based content be displayed passively within a scrolling, horizontal ticker, whereas other categories of location-based content should be displayed in a more dramatic way, such as with specialized font attributes, in a particular color, and with accompanying animations, such as "entrance" animations.

Presentation effects including contrasting font color, "new" graphics, a change in the order of presented items and audible and tactile alerts may be used to denote new content received. A "free form" ticker could be employed in which new, location-based content "flies" onto the display screen without being contained within the specified ticker format(s). Similarly, content can "fade in" or "fade out" from the display screen, or "builds" may be used in which fragments of content are displayed one after the other, rather than all at the same time, until the complete content is displayed. For example, rendering engine 220 could be instructed to display a particular local traffic update with an entrance animation that flies across the display screen and flashes. The entrance animation could be further accompanied by an audible or tactile notification, such as a ring tone or device vibration to alert the user of a traffic accident on the transportation route of the user. Rendering engine 220 may further implement numerous attributes and effects pertaining to the shape, size, location, scroll speed, font attributes, color schemes and themes of the content displayed in the ticker and of the behavior of individual ticker items or categories of ticker items and render them on the display of communication device 102 accordingly.

Not only can content be displayed on the ticker in a variety of different ways, but content can become available to ticker client software 200 from multiple content sources and over various types of network connections, or "bearers." In one embodiment, content providers supply content through various gateways to ticker server 300, as shown in FIG. 3. Content providers may alternatively submit product and service content to the ticker server 300 directly. In either case, the content may then be transmitted to ticker client software 200 using, for example, a data connection over a cellular network, or via a Short Message Service (SMS) message. Alternatively, content can be supplied to ticker client software 200 directly, without having first been aggregated at ticker server 300. For example, a user of mobile communication device 102, carrying ticker client software 200 and equipped with a Bluetooth chipset, may receive content directly when it encounters another Bluetooth device. Bluetooth is a wireless technology typically used for short range communication of data and voice from one device to another. An example of a situation in which content is transmitted to a communication device via a Bluetooth network concerns an art exhibit. In this example, the art museum housing the exhibit has a Bluetooth system with content to transmit to communication devices of users visiting the exhibit. When users encounter an access point for the Bluetooth system of the art museum, those users receive a detailed description of the art exhibit the users are currently viewing. In the example of the art exhibit, the content sent to mobile communication device 102 is both location-based and context-aware. The content is location based in that communication device 102 automatically senses the Bluetooth connection due to the location of the communication device 102 proximate to the Bluetooth access point. The content to be transmitted to the communication device 102 is context aware in the sense that the communication device 102 receives content specific to the context, in this case an art exhibit.

In addition to communicating the ticker content directly to the communication device 102, the Bluetooth connection, or other connection(s), could deliver the content via an alternative mechanism such as email. For example, when communication device 102 communicates with the Bluetooth access point, communication device 102 might provide the email address of the user of communication device 102 to the art exhibit system. The system could then send specific content to the email address associated with the communication device 102 with special codes indicating how the content is to be interpreted by the ticker client software 200 on communication device 102. Communication device 102 may further be configured to interact with an 802.11 network. When the communication device 102 encounters an 802.11 wireless access point, communication device 102 can receive content, including location-based, context-aware content such as a promotional coupon for a nearby restaurant, and then display the content in the ticker at 12 p.m. or at another user-specified lunchtime. Ticker client software may also monitor networks such as FM radio and satellite radio networks and "pick and choose" broadcasted content that is relevant to preferences selected by the user of communication device 102.

As discussed above, content may be transmitted to communication device 102 via multiple transmission modes. One value in using multiple bearers is that some bearers are better suited to delivering certain types of content than others. In some embodiments, the ticker system 100 may select a bearer based on the nature of the content itself. For example, a very small data payload that should be delivered to communication device 102 in "real-time" or near real-time, such as a local traffic alert, may be delivered using broadcast SMS. Conversely, a data payload that is larger in size and that contains personalized content, such as tourist site information that includes a review of a nearby restaurant and a discount coupon, may be delivered to communication device 102 over an IP connection. In other situations, the fastest way to obtain real-time data, such as a baseball score, while using the least amount of communication device overhead, or bandwidth, may be for the ticker client software 200 to obtain the baseball score from a satellite or terrestrial radio broadcast. Furthermore, highly personalized content, regardless of the size of the transmission, may be more appropriately delivered to communication device 102 over a cellular network using a data connection. Certain types of sensitive content can be transmitted using a secure transmission mode. It should be noted that regardless of the content source or transmission method, the content is typically transmitted to mobile communication device 102 at a time when the device is not otherwise engaged in a communication session, so as to avoid any disruption in communication.

In one embodiment, a suitable bearer may be selected by a content provider, while in another embodiment, a suitable bearer may be selected by the server, the device, or the communication device user. A situation may arise where the bearer specified by the communication device user may not be the same as the bearer specified by the content provider or other system element, thus resulting in a conflict that must be resolved prior to transmission of the content. Any number of conflict resolution mechanisms can be devised, taking into consideration, variables such as the size and nature of the content, available bandwidth, and other variables that are also used in the initial selection of the bearer. The conflict may be resolved, for example, by the content provider, the user, the server, or by some third party. In one exemplary case, where a content provider and a communication device user select different bearers for transmitting specified content, the ticker client software 200 ultimately determines which bearer will transmit the content.

III. Ticker Interaction and Use

With continuing reference to FIGS. 2 and 3, users may interact with the ticker of ticker client software 200. Action user dispatcher 222 manages user interaction with the ticker while at the same time interfacing with the rest of the communication device 102, on which the ticker is hosted, in response to user interaction with the ticker. Examples of user interaction with a ticker item include clicking on the item, scrolling to the item, highlighting the item or otherwise selecting the item. User interaction with the ticker can cause a secondary action. For example, the user may employ ticker navigation effects, such as scrolling through the ticker at a faster rate, skipping items, or even deleting ticker items by pressing a single button on the mobile communication device. In another example, a URI associated with the ticker item is launched when the user selects the item, resulting in display of a web page on the ticker containing additional content about the item. In yet another example, as the user approaches his favorite video store, he may receive an advertisement in the ticker announcing the availability of a new movie for rent. Selection of the advertisement can give the user the option of downloading a java application, an example of which is a movie trailer. The user may then wish to send an email or other message to the store to reserve the movie. The action dispatcher 222 interfaces with the appropriate external systems to manage download of the java application and dispatch of the message to the store. Once the movie trailer is downloaded, the movie trailer can be viewed on the communication device 102.

Another example of ticker use is to conduct a poll or a survey. For example, users leaving the premiere of a new movie could be presented with a poll in the ticker. Clicking on certain items in the ticker would indicate the user's response to the questions in the poll. Similarly, users could receive a customer satisfaction poll upon leaving a retail store from which they have purchased a product or service. Additionally, selection of an appointment notification displayed in the ticker can cause the calendar application of the ticker software to be launched within the ticker. Launching the calendar application can enable the user to view the full details of the impending appointment, and receive driving directions to the appointment based on the current location of the user.

Finally, the exemplary ticker client software 200 employs usage accountant module 224 to monitor and track the ticker items displayed within the ticker and the various ways in which the user interacts with the ticker items. For example, selecting an advertisement for a new restaurant may result in driving directions being displayed in the ticker, and the user may further be presented with an option for automatically dialing the restaurant phone number to make a reservation. The usage accountant module 224 monitors and reports on the transaction so that the advertiser receives feedback about response of the user to the advertisement. In this case, whether or not the user dials the phone number is a very important piece of information for the advertiser. At the same time, the selection of the ad by the user is accounted for by the ticker client software 200 so that the advertiser of the restaurant can be charged, as with pay-for-performance advertising business models. However, users may prefer not to allow advertisers and other content providers to receive feedback about user transactions. If a user does not want content providers to receive feedback about transactions of the user, the use can disable the usage accountant module 224.

In addition to monitoring and reporting on transactions that result in billing activity, user interaction with location-based items in the ticker is also aggregated in order to better understand user preferences, supply the user with content which is even more finely tuned over time to meet user needs, and to maximize the effectiveness of advertising campaigns. With reference to FIG. 3, the usage information gathered by usage accountant module 224 is periodically reported to usage accounting module 302 of ticker server 300. Moreover, the user may view a historical record of ticker items that have been presented on communication device 102, and a history of user interaction with the ticker, by selecting an icon in the ticker linked to a web page or otherwise configured to provide a report of the historical ticker data to the user.

IV. Registration, Content Aggregation and Campaign Management

With continuing reference to FIG. 3, additional details are provided concerning an exemplary embodiment of ticker server 300. In an exemplary embodiment, ticker server 300 operates in conjunction with a plurality of content providers and communication devices 102. To gain access to the content offered by the plurality of content providers, ticker client software 200 resident on communication device 102 registers with device registration and location tracker module 304 of ticker server 300. Using user interface elements of ticker client software 200, the user of communication device 102 may further define rules and express preferences concerning the type of content in which the user is interested and the manner in which the content should be presented within the ticker on the communication device 102. Once expressed by the user, the rules and preferences may be stored on communication device 102 in rules and preferences module 208 for later use by scheduler module 212, or in rules and preferences module 306 of ticker server 300, or both. Along with specifying rules and preferences, a user of a landline communication device such as a PC or telephone may also indicate the geographical location of the device by completing an information profile during a registration process. Once initial registration is completed, ticker client software 200 may begin receiving content.

In an exemplary embodiment, ticker server 300 aggregates some content, but as previously noted, other content may be delivered without aggregation via another mechanism to ticker client software 200 on mobile communication device 102. Content providers may become subscribers of the ticker service by registering with the service using membership manager module 308. Once registered, content providers can provide content to the ticker server for distribution to registered communication devices 102. In some embodiments, content providers can deliver content directly to the ticker client software 200, and in some situations the user may be prompted to accept or reject the content that is available for provision directly to the ticker client software 200.

With continuing attention to FIG. 3, content can be delivered to ticker server 300 in various ways. First, content providers, whether large entities or smaller, independent content providers, feed content to the ticker server through content aggregator gateway 310 that provides a way for potentially disparate content servers to interface with ticker server 300. Content received via content aggregator gateway 310 is then stored in data store module 312. Alternatively, vendors of products and services may choose to input company and product information, as well as advertising and promotions, into campaign manager module 314 of ticker server 300. In another embodiment, a third party marketing campaign management system may interface with ticker server 300 to deliver content to data store module 312. Campaign manager module 314 provides vendors and other content providers the capability to create and manage marketing campaigns for their products and services. Product and service information may be input by providers via a web page and can include details such as the message to appear on the ticker, which customers should see which messages, product descriptions, competitive comparisons, promotional discounts and other information. Terms of use, pricing, promotion duration, and other marketing and advertising campaign details can be specified, implemented, and updated using campaign manager module 314.

In general, content can be encrypted before the content is transmitted to the communication device 102. Decryption can be performed, for example, by providers: transmitting a key to the communication device 102 at an appropriate time or location to enable the communication device 102 to decrypt content that has already been received.

Once the encrypted content is downloaded to data store module 210 of ticker client software 200 (see FIG. 2), campaign manager module 314 can initiate transmission of a key to the communication device 102 to "unlock" the content such that the content can be displayed within the ticker when communication device 102 arrives at a specified location and/or at a specified time. Campaign manager module 314 further provides capability for receiving feedback from usage accountant module 224 of ticker client software 200 (see FIG. 2) and reporting on how many users have responded to vendor campaigns by interacting with the ticker. In addition, metadata, such as target user demographics and terms and conditions, may be provided along with the content provided to ticker server 300. For example, an automobile manufacturer may specify that an advertisement for a newly released vehicle should be sent to communication devices within certain proximity of a dealership to encourage users to stop by to view the new vehicle. The automobile manufacturer may further specify the age of users to receive the advertising content and may also send a special promotional offer to users who are previous buyers from the manufacturer and whose lease agreements are close to expiring An additional feature of at least some embodiments of the ticker server 300 is security and authentication module 316. Security and authentication module 316 provides a variety of security services, including secure registration and authentication both for communication device users and for content providers. Furthermore, security and authentication module 316 monitors the source of incoming content to ensure that only credible, registered users are interacting with the ticker server and that only authenticated content is delivered to the ticker client software 200.

While security and authentication module 316 provides a variety of security services, usage accounting module 302 performs a variety of processes related to tracking the use of the content provided to ticker client software 200. Exemplary processes performed by usage accounting module 302 include receiving usage data from usage accountant module 224 (shown in FIG. 2) of ticker client software 200 and exporting usage data to external billing, reporting, and campaign management systems.

V. Device Location and Content Transmission Processes

Figure 4:
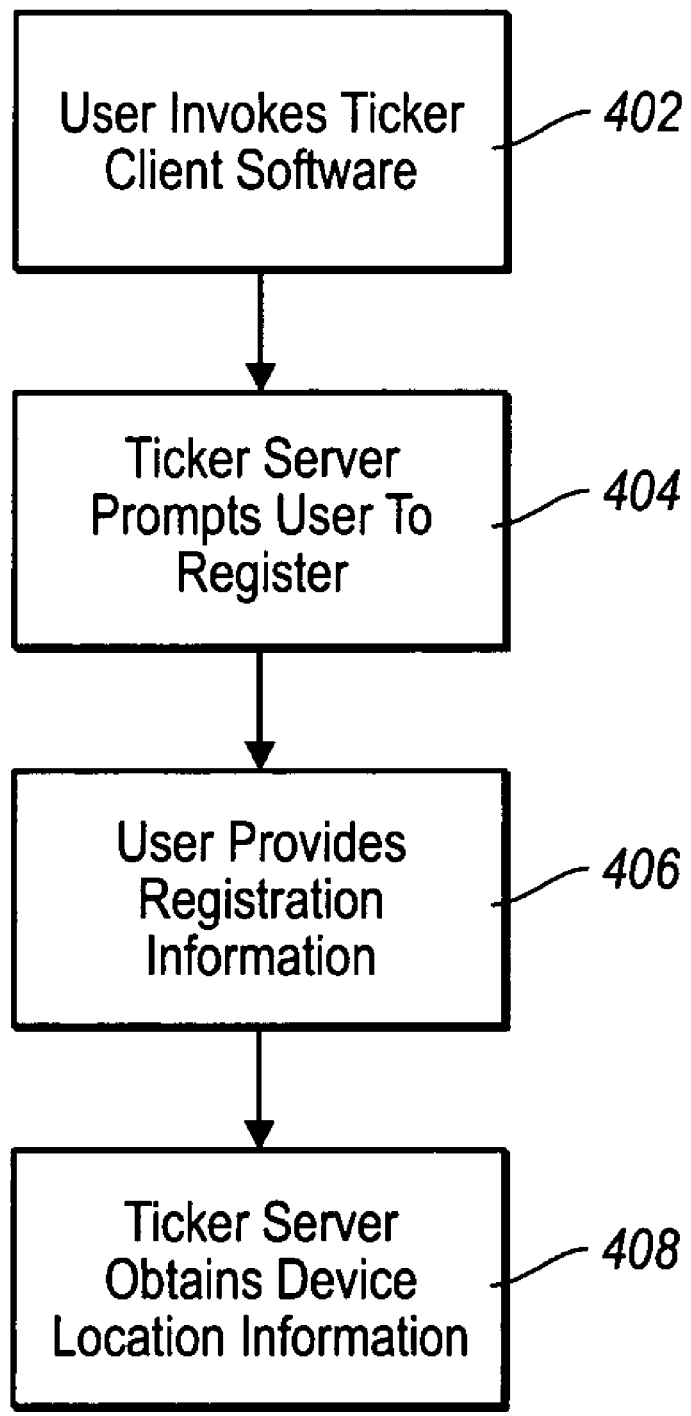
FIG. 4 is a flow chart illustrating aspects of a process for registration and location of a mobile communication device.

With reference now to FIG. 4, one embodiment of a process 400 concerned with initial registration and location of mobile communication device 102 is illustrated. In operation, communication device 102, which is configured with ticker client software 200, establishes a network connection. At stage 402, ticker client software 200 is invoked in response to the user powering on communication device 102 or by pressing a button, a soft key, or issuing a verbal command to the communication device 102. At stage 404, the user is prompted by ticker server 300, which has established communication with ticker client software 200, to register with the ticker service. At stage 406, the user provides registration information, including billing address, device information, and content preferences, including ticker and content presentation attributes, and any other information requested by ticker server 300 in conjunction with ticker service registration requirements. In some embodiments, some or all of this information is provided automatically by an associated service, such as the phone company handling the cell phone service if the ticker resides on a mobile phone. Upon completion of stage 406, ticker client software 200 of communication device 102 is prepared to receive content. At stage 408, location tracker module 304 of ticker server 300 (see FIG. 3) obtains location information for communication device 102. In one case, communication device 102 determines the location of communication device 102 using a positioning technique, such as those disclosed herein, and reports the location of communication device 102 to location tracker module 304. In other examples, location tracker module 304 queries one or more network elements, such as a home location register (HLR), a visiting location register (VLR) or another element in the network to obtain location information for a communication device 102.

Figure 5:
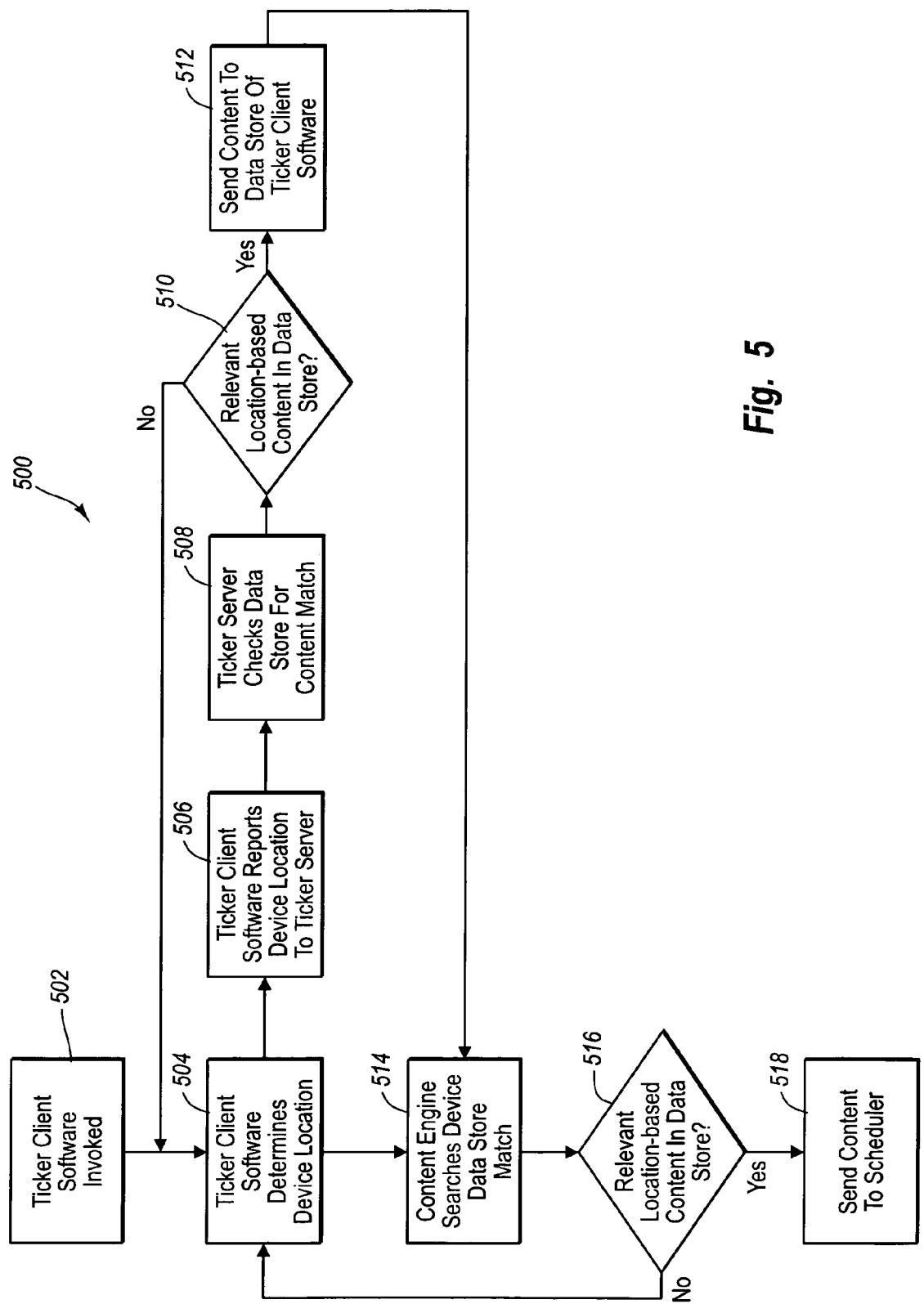
FIG. 5 is a flow chart illustrating a process for transmitting content to a communication device.

Turning attention now to FIG. 5, an exemplary process 500 for providing location-based content from ticker server 300 to ticker client software 200 on communication device 102 is illustrated. In this exemplary process, location-based content can be selected for scheduling and presentation from local data store module 210, from ticker server data store module 312, or both. In operation, ticker client software is invoked at stage 502 either automatically by powering on communication device 102, pressing a button or soft key on communication device 102, or by a voice command. At stage 504 the ticker client software establishes the geographical location of the communication device 102.

Once the geographical location of the communication device 102 is determined by ticker client software 200, the process for providing location-based content can proceed along two different paths, which paths can be executed simultaneously. At stage 506 the ticker client software 200 reports the location of the communication device 102 to location tracker module 304, of location-based ticker server 300. When the ticker client 200 reports the location of the communication device 102 to location tracker module 304, a query runs at stage 508 against data store module 312 to search for relevant location-based content. At stage 510, a decision is made as to whether there is a match between available content and the location of the communication device 102 and/or preferences of the user of communication device 102. If a match is found, at stage 512 the content can be sent to data store module 210 of ticker client software 200 using any of a number of transmission methods previously mentioned. In some embodiments, content that is low priority may be transmitted to ticker client software 200 at a time that is determined to be an off-peak time for network traffic. That is, the location-based ticker server has access to information about network loads such that the location-based ticker server can determine peak and off-peak times with regard to traffic load and transmit the content accordingly based on the priority of the content.

Although not depicted in FIG. 5, filter module 202, meta tagging module 204, and security module 206 may be employed to validate the source of the content and associate metadata with the content before the content is stored in data store module 210. Meanwhile, at stage 514, having established the location of the communication device 102, content manager 218 can query data store module 210 of ticker client software 200 to search for relevant content already stored on the communication device 102 pending display, or other presentation. In addition, content manager 218 can query data store module 210 for newly received location-based content. The process continues at stage 516 where content manager 218 determines whether any of the content in data store module 210 is a match for the current location and/or preferences of the user of communication device 102. If content manager 218 determines that there is a match between the current location and/or preferences of the user, the content is sent to scheduler module 212 at stage 518 and prepared for display within the ticker.

Figure 6:
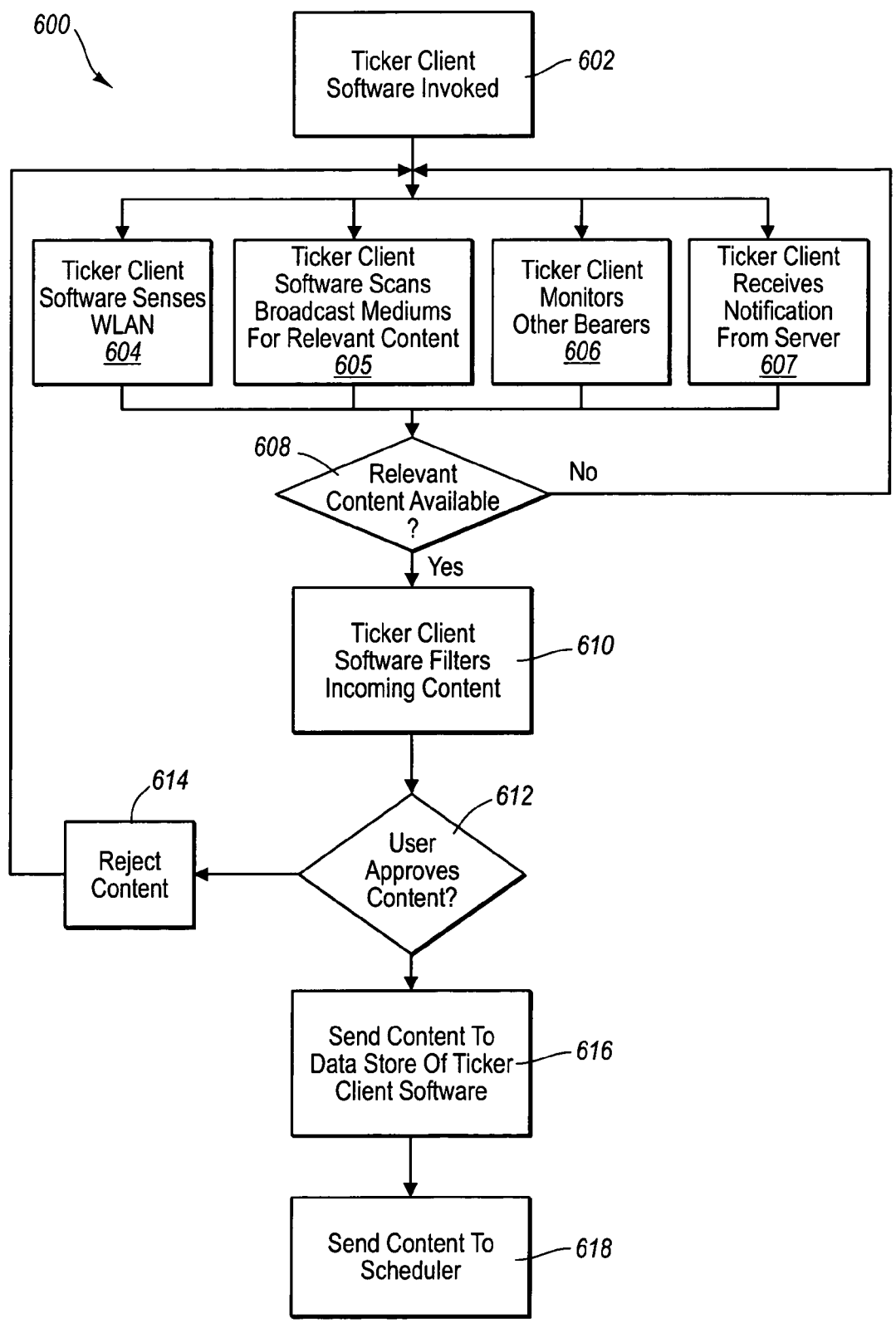
FIG. 6 is a flow chart illustrating a process for transmitting content to a communication device via multiple bearers.

With reference now to FIG. 6, a process 600 is illustrated for receiving content from multiple sources, for example, via a broadcast medium or from the wireless access point of an 802.11 or Bluetooth network. In one embodiment, invoking the ticker client software at stage 602 causes the ticker client software to automatically attempt to detect a wireless access point at stage 604, scan various types of terrestrial or satellite broadcasts for relevant content at stage 605, and monitor other bearers at stage 606. These bearers may include Bluetooth; WiFi, WiMAX or other 802.11 wireless networks; AM or FM radio waves; paging networks; paging channels on cellular or PCS networks; SMS transmissions; and vertical blanking interrupts on TV transmissions. The ticker client software may also simultaneously receive notification of content from the server at stage 607. At stage 608, the ticker client software determines if any relevant content is available. If relevant content is available, wireless networks begin sending content to the ticker client software. At stage 610, the ticker client software filters incoming content for relevancy and credibility. In an exemplary embodiment, the user can be prompted by security module 206 of ticker client software 200 to explicitly approve incoming content as depicted at stage 612. Stage 612, however, is not required and rules pertaining to approval of content can be specified in advance by the user. In one example, if the user rejects the incoming content, as shown in stage 614, the process returns to stages 604 and 606 wherein ticker client software "monitors" various broadcasts and continues to look for wireless access points. In another example, if the user accepts the incoming content at stage 612, the process continues to stage 616 in which the content is sent to the data store of the ticker client software. Although not depicted, meta tagging module 204 may assign metadata to the incoming content describing the attributes of the content so that the content can be properly indexed in data store module 210. The content is then sent to the scheduler and scheduled for display within the ticker, as shown in stage 618.

VI. Content Priority Scores

Figure 7:
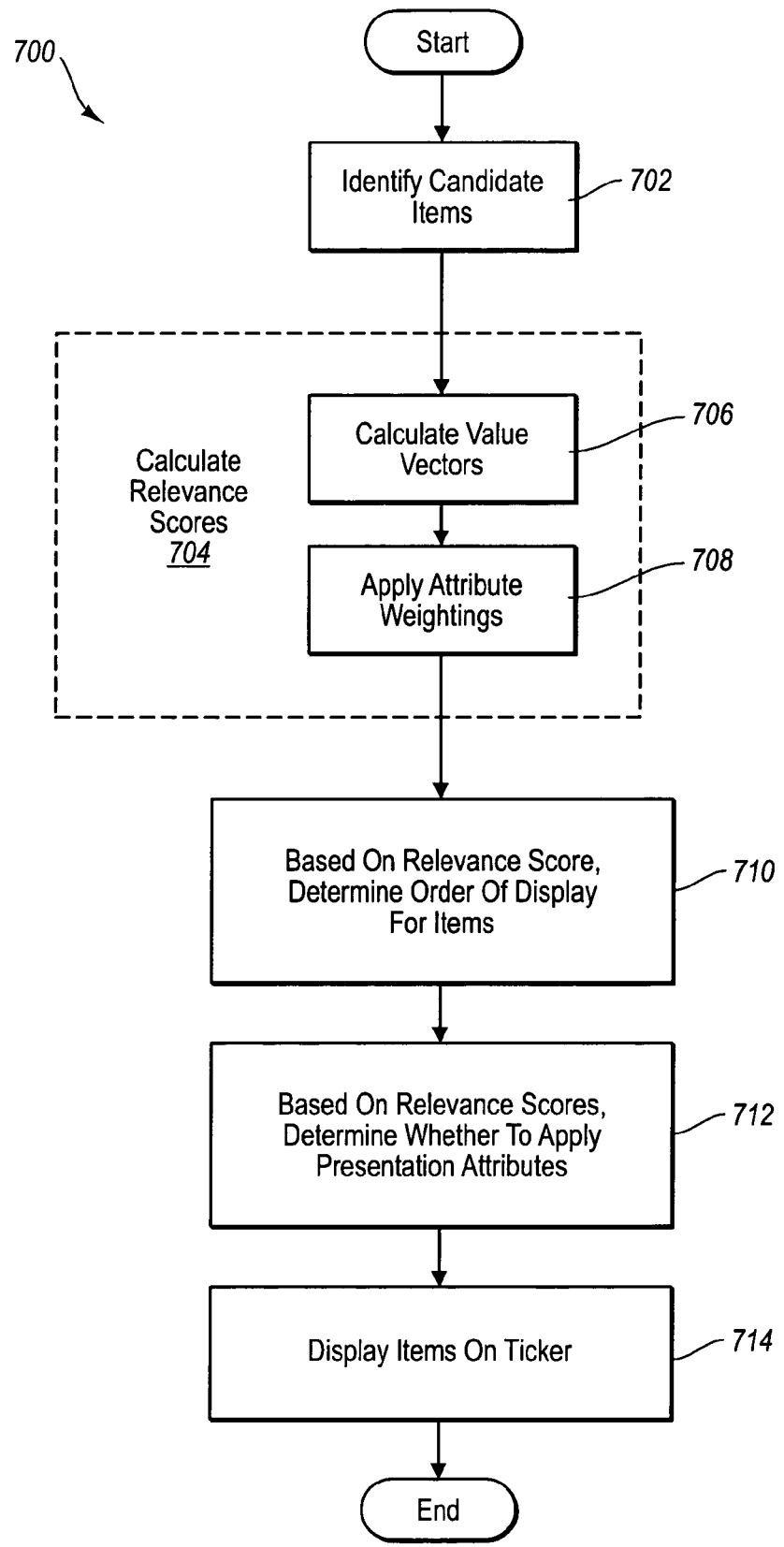
FIG. 7 is a flow chart illustrating aspects of a scoring algorithm for selecting and presenting content within a ticker on a presentation device.
Figure 4:
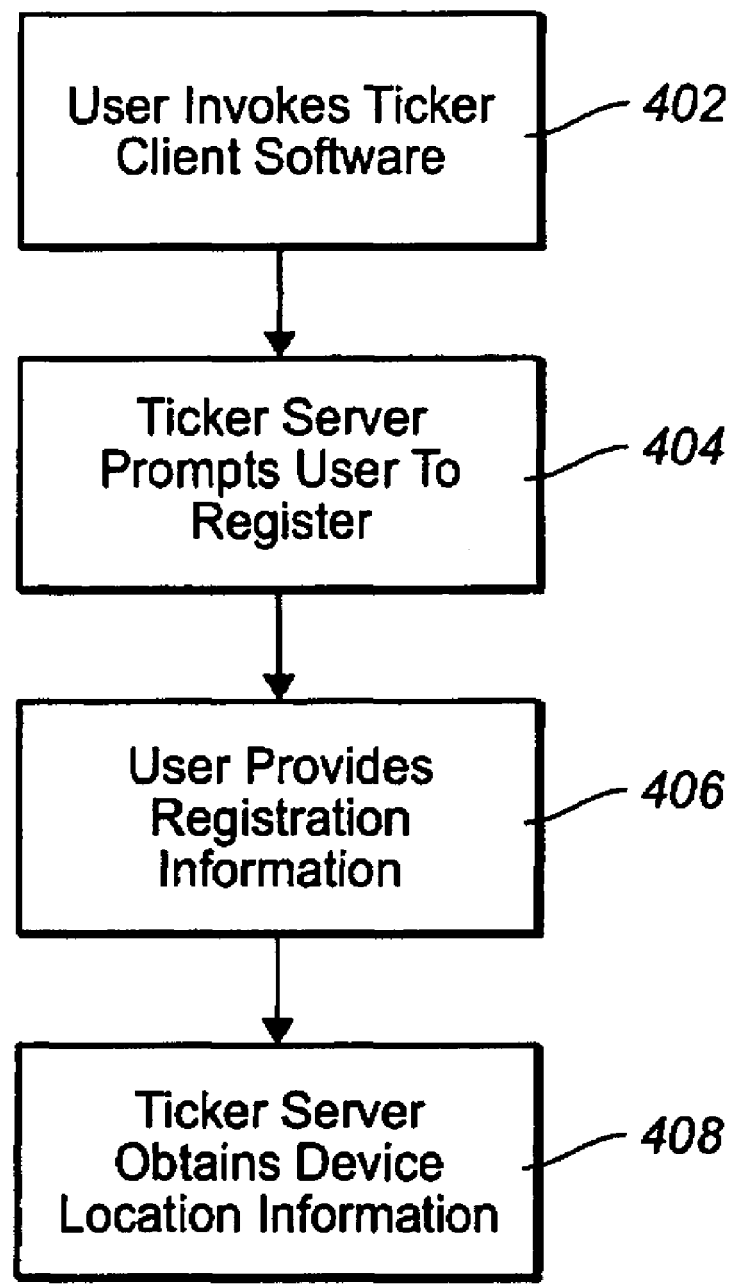

With reference to FIG. 7, details are provided concerning the process of using one potential algorithm employed by scheduler module 212 of ticker client software 200 (see FIG. 2) to determine the timing, order, and/or frequency with which content received into data store module 210 is displayed within the ticker. Conditions such as, but not limited to, strength of user preferences, time sensitivity of the content, degree of relevance of the content, proximity to a location pertaining to the content, how often the content has been shown, content provider business arrangements, marketing campaign rules, and other conditions are evaluated and a numerical value reflecting the priority of the location-based content is assigned to the content. Content with the highest score is displayed within the ticker on communication device 102 first, and if the score surpasses a certain priority threshold, presentation attributes, such as contrasting font colors or notifications, may be applied to the displayed content.

For example, three items (an advertisement for Peet's coffee, an updated stock quote, and an ad for McDonalds) are identified as being candidates for display on the ticker at stage 702. The scoring system calculates a relevance score for each item at stage 704 based on a number of system-defined attributes; for example proximity, user preferences (our user loves coffee and follows the stock market), and the advertising rate paid by the advertiser are the attributes considered in the calculation. The process of calculating the relevance score shown at stage 704 includes calculating a value vector for each of these three attributes for each item, as shown in stage 706. With value vectors corresponding to proximity, user preferences, and the advertising rate paid by the advertiser, and using a scale from 0 to 100 as an example, the score for Peet's might be (50, 100, 50) since the user is a few blocks from the coffee shop, has specified a strong preference for Peet's brand coffee, and the advertising fee being paid by Peet's is in the middle of the range of advertising fees paid. For the stock quote, the value vector might be (0, 100, 0), since proximity does not apply, the user has expressed a preference concerning stock quotes, and no advertising fee is being paid, and for the McDonalds ad the value vector is (0, 0, 75) since the user is not near a McDonalds, nor has the user expressed a preference for McDonalds, but McDonalds is paying a very high advertising rate to promote their new product in the ticker display.

Given these three value vectors, an attribute weighting is then applied in stage 708 of the process of calculating the relevance scores. In this example, proximity is most important and has a weight of 100, user preferences are the next most heavily weighted attribute with a weight of 80, and the advertising fees paid are assigned a weight of 50. A score can now be calculated for each of these items, which will determine the order in which the items are displayed in the ticker, according to stage 710. In addition, as shown in stage 712, the scores calculated for each item can be used to determine whether to apply presentation attributes to the items when the items are displayed on the ticker, as shown in stage 714. The calculations for these items in this example are as follows:

Peet's: 50*100+100*80+50*50=15500;

Stock quote: 0*100+100*80+0*50=8000;

McDonalds: 0*100+0*80+75*50=3750.

Thus, in this example, the Peet's item would be displayed first, the stock quote second, and McDonald's last. These scores can also be used to determine how often to show content. In this example, the device might show the Peet's coffee item twice as often as the stock quote, and four times as often as the McDonald's item. Although not shown in the current example, other scoring systems and scheduling systems could be used, and the specific parameters can be highly customized for the particular application.

VII. Examples

While embodiments of the invention are described in detail herein, the invention can be further illustrated by presenting a specific example of how the ticker methods can be applied to provide various useful and novel results. It is noted that the following example is presented only to illustrate the invention, and the specific implementation described hereinafter does not limit the scope of the invention.

In this example, a user has a mobile communication device that is suitably equipped to receive data using for example, a cellular network, the short message service (SMS), the 802.11 family of wireless local area networks (WLAN), a Bluetooth network, satellite and terrestrial broadcast networks or any other type of network, combination of networks, or network connections to which the mobile communication device can connect and receive data transmissions.

The mobile communication device is also equipped with ticker client software that enables a ticker to be rendered on the display of the mobile communication device. The ticker client software communicates with a ticker server to receive content that has been aggregated from multiple content providers and is then provided to the ticker on the communication device based on certain considerations. The user may have a relationship with one or more content providers from which content is received into the ticker of the communication device, and the content may also be transmitted to the user's communication device without the user having subscribed to any particular service or formed a relationship with a content provider. In some cases the user may express preferences for certain types of content that may then be received by the ticker client software and displayed in the ticker. In other cases the user may choose to block certain types of content.

Based on any of a number of considerations such as available network connections, the location of the mobile communication device, user preferences, content display rules, or any combination of these or other considerations, the ticker on the communication device periodically receives content. Moreover, based on other considerations such as the capabilities of the communication device, the traffic load on a particular network, and the size, type and priority of the data transmission intended for the ticker of the communication device, one bearer may be selected instead of another to utilize the available network resources optimally and transmit content to the ticker of the communication device in a way that is cost efficient and may conserve bandwidth. Furthermore, any of a number of content delivery mechanisms that operate in conjunction with data transmission modes may be used to deliver content to the ticker, including multimedia messaging service (MMS), really simple syndication (RSS), email, and many other content delivery mechanisms.

Once the content is received by the ticker client software on the communication device, a scheduling system of the ticker client software determines the time at which the content will be displayed in the ticker, the order in which it will be displayed relative to other ticker items, the frequency with which the content should appear in the ticker, and the presentation attributes that should be applied to affect the appearance of the content displayed.

In this example, the cellular telephone user subscribes to a ticker service of the invention and indicates preferences for categories of content by inputting the preference via a user interface element on the cell phone or an associated website. This user could specify, for example, a preference for professional baseball and in particular, the San Francisco Giants. The preferences are then stored for future reference by the system. As a result, baseball scores from all of the professional teams are transmitted to the user's mobile device as they become available and they are received by the ticker client software. The scheduling system then determines the timing, order and frequency with which the baseball scores should be displayed in the ticker, relative to the other content received and scheduled for display, taking into account that this user prefers baseball.

In some cases, data may be transmitted directly to a communication device without having first been aggregated at the ticker server. In this example, the user is interested in receiving player statistics when attending a game at the stadium. The Professional Baseball League Association is a vender member of the ticker service. As a service for its Fan Club members, the Association created "virtual baseball cards" that include player statistics, the day's batting order, and other interesting baseball trivia, and sends the data to the ticker service to be aggregated on the server and parceled out to tickers coincident with the current batting order. In order to receive the player statistics, the user joined the Giants Fan Club.

When the user enters the Giants' stadium, the client ticker software of the user's communication device encounters the Giants' 802.11 WiFi network. 802.11 WiFi is a wireless technology typically used for short-range communication of data and voice. By knowing which 802.11 WiFi access point the user is in communication with, the server software is able to establish the location of this device. In this example, because the user's device is within the range of the stadium's local network, the Professional Baseball League Association is able to transmit its "virtual baseball card" data directly to the user's device via the stadium's 802.11 WiFi network. For Club members watching at another location beyond the reach of the stadium's local network, a more optimal bearer is selected to transmit the data. Finally, because the ticker service is now informed of the geographical location of the user's device, and because this user set a very high preference for Giants information, the ticker service will give the "virtual baseball cards" higher priority than other incoming content such as the San Francisco traffic report.

Content characteristics such as size and format are considered when determining the optimal mode to transmit the data. The Giants Fan Club wishes to increase Fan Club membership, so late in the game, it sends all device users who expressed a preference in the Giants—including current Fan Club members and non-members, whether they are watching the game at the stadium or in another location, or even if they are not watching the game—a video of a spectacular triple play that occurred in the first inning. Based on the particular characteristics of this file, including its large size and format, and in consideration of the widely-dispersed locations of the various communication devices, the ticker service determines that the video will be transmitted via the Giants' 802.11 WiFi network to the limited number of devices within its reach, and sent via satellite to everyone beyond the range of the stadium's local network.

In this example, there is an opportunity for time-based transmission of data. Ticker content can be transmitted or displayed at a time or manner specified by a triggering event. Examples of such triggering events include a specified time or location. Upon the occurrence of the triggering event, content that has been designated as being appropriate for the triggering event (e.g., appropriate for the current time or location of the communication device) is displayed on the ticker or transmitted to the communication device.

Member vendors of the ticker service may register information about their products and services, including advertisements, promotional information and entertainment-related information with the ticker service. A member vendor of the ticker service could register a promotional coupon with the service, which is then transmitted to communication devices located, for instance, in a particular region such as Northern California. The promotional coupon may be associated with metadata that can include any of a number of rules pertaining to when and how the coupon should be displayed within the ticker.

The promotional content may be downloaded at any time—such as during an off-peak time for network traffic—regardless of the user's current location, and stored on the device, pending the decision of the scheduling system and location specified in the content's proximity rule.

Continuing with this example, the Giants' licensed concessionaire and ticker service member, Pizza Hut, wishes to promote its new line of snacks and to increase patronage to stadium venues in the fourth inning, when sales typically slow down. The service transmits Pizza Hut coupons to select devices the night before the game, and stores it for display on the ticker if and when the two specified trigger events occur—if the device appears inside the stadium, and when the third inning stretch begins.

Some content may require a secure transmission. For example, the user of the device purchases an expensive dinner for some clients in the Giants VIP lounge. After any VIP lounge purchase, the establishment automatically transmits a confidential account statement to this user's ticker client software, in adherence to the user's pre-set preferences. The statement typically details recent purchases and includes other personal information. If the user prefers, the Club may also send the statement along with an urgent notice to the ticker of the device, asking the member to verify a purchase. Because the ticker server recognizes the security requirements specified by the member vendor, it transmits the account statement to the client ticker software using a secure data channel over a cellular network. The Giants VIP Club icon appears in the device's ticker, flashing to indicate if a user action is required.

After the content is transmitted to the device using any of the aforementioned methods, the transmitted data is indexed in a data store on the device according to its attributes, and a scheduling system is employed to determine when and how the content will be displayed within the ticker on the device. In the most recently described situation, rules received in metadata associated with the content, along with user preferences, determined that the VIP Club's account statement notification should be displayed within the ticker immediately in a red font with a flashing icon if user action is required. The device could also emit an audible tone and/or vibrate to notify the user that actionable content pertaining to an important preference has arrived in the ticker. Other presentation attributes of the content are also possible, and may be determined by the scheduling system.

VIII. Telecommunication Devices and Computing Environments

Embodiments of the present invention may be implemented in connection with a special purpose or general purpose telecommunications device, including wireless telephones and other telephony-enabled mobile devices, landline telephones, or special purpose or general purpose computers that are adapted to have telecommunications or data networking capabilities such as cable set top boxes or PCs. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures, and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes that come within the meaning and range of equivalency of the claims are to be embraced within their scope.

What is claimed is:

1. In a communications environment including a communication device that can receive content over multiple networks, a method for processing content to be presented on a ticker of the communication device, comprising:
   selecting content to send to the communication device equipped to receive the content over a plurality of networks;
   notifying the communication device that the content is available;
   receiving an identity of an available network from the communication device;

automatically evaluating one or more optimal transmission mode factors to identify a plurality of available transmission modes over a plurality of networks for transmitting the content to the communication device, wherein the one or more optimal transmission mode factors comprise at least one of the following: content size, content format, content subject matter, content priority requirements, content security requirements, transmission cost, number of recipients, and network characteristics;

selecting a first transmission mode to transmit the content over a first network based on the one or more optimal transmission mode factors;

determining whether the first transmission mode includes a capability of transmitting the content to the communication device based on the one or more optimal transmission mode factors;

if the first transmission mode is not capable of transmitting the content to the communication device such that a conflict exists between the first transmission mode, and the available network identified by the communication device, switching to the available network identified by the communication device as a second transmission mode to transmit the content to the communication device over a second network; and transmitting the content to the communication device via the second transmission mode, such that the content is:
received at the communication device via the second transmission mode;
locally stored at the communication device; and
presented using a ticker of the communication device.

2. The method as recited in claim 1, wherein the content is aggregated at a ticker server prior to transmission to the communication device.

3. The method as recited in claim 1, wherein the transmission mode is one or more of:
a paging network;
a paging channel on cellular or PCS network;
an SMS transmission;
AM or FM radio waves;
a traffic channel on cellular or PCS network;
vertical Blanking Interrupts on TV transmission;
satellite transmission;
Bluetooth protocol; and
WiFi, WiMAX, or another 802.11 protocol.

4. The method as recited in claim 1, wherein selection of the first or second transmission mode is based in part on a location of the communication device.

5. The method as recited in claim 1, wherein a choice is made between a point-to-point and a broadcast transmission when selecting the first or second transmission mode.

6. The method as recited in claim 1, wherein the content comprises location-based content that is selected to correspond to a geographic location of the communication device.

7. The method as recited in claim 1, wherein the content comprises a notification of an email message sent to an email address associated with the communication device.

8. The method as recited in claim 1, wherein the content comprises at least one of audio, video, graphics, and text.

9. The method as recited in claim 1, wherein the communication device is a mobile communication device and the content is transmitted to the mobile communication device at a time when the mobile communication device is not otherwise engaging in communication.

10. In a communications environment including a communication device that can receive content over a plurality of networks, a method for transmitting content to be presented on a ticker of the communication device, comprising:
locating the communication device within the communications environment;
obtaining content to send to the communication device;
receiving an identity of an available network from the communication device;
automatically evaluating one or more optimal transmission mode factors with respect to a plurality of transmission modes over a plurality of networks, wherein the one or more optimal transmission mode factors comprise at least one of the following: content size, content format, content subject matter, content priority requirements, content security requirements, transmission cost, number of recipients, and network characteristics;
selecting a first transmission mode from the plurality of transmission modes and a first network from the plurality of networks to transmit the content, based on the evaluation of the one or more optimal transmission mode factors;
determining whether the first transmission mode includes a capability of transmitting the content to the communication device based on the one or more optimal transmission mode factors;
if the first transmission mode is not capable of transmitting the content to the communication device such that a conflict exists between the first transmission mode, and the available network identified by the communication device, switching to the available network identified by the communication device as a second transmission mode to transmit the content over a second network; and
transmitting the content to the communication device via the second transmission mode on the second network such that the content is stored locally at the communication device.

11. The method as recited in claim 10, wherein selection of the first or second transmission mode is based in part on a location of the communication device.

12. The method as recited in claim 10, wherein the content is aggregated prior to transmission to the communication device.

13. The method as recited in claim 10, wherein the content comprises a notification of an email message sent to an email address associated with the communication device.

14. The method as recited in claim 10, wherein the content comprises at least one of audio, video, graphics, and text.

15. The method as recited in claim 10, wherein the content that is obtained for transmission is consistent with a set of one or more predefined user preferences.

16. The method as recited in claim 10, wherein selecting the first or second transmission mode further comprises selecting the first or second transmission mode based on a location of the communication device relative to a content provider that provided at least a portion of the content.

17. In a communication device that is capable of communicating with information sources in a communications environment over a plurality of networks, a method for receiving content comprising:
initiating ticker client software;
automatically monitoring one or more available transmission modes and one or more available networks;
receiving a notification of available content from a ticker server;
sending an identity of any available transmission modes and any available networks to the ticker server;

automatically receiving the content from an information source over one of the available transmission modes over one of the available particular networks, wherein:
   the content has been identified as being of interest to the communication device; and
   the particular transmission mode and particular network over which the content is received have been selected from among a plurality of available transmission modes and plurality of available networks based on an evaluation of one or more optimal transmission mode factors, wherein the one or more optimal transmission mode factors comprise at least one of the following: content size, content format, content subject matter, content priority requirements, content security requirements, transmission cost, number of recipients, and network characteristics;
locally storing the content received from the particular network;
automatically scheduling a timing, order, or frequency with which the content is presented; and
presenting the content using a ticker of the communication device.

18. The method as recited in claim 17, farther comprising:
receiving content from multiple information sources, including said information source;
locally storing the content received from the multiple information sources; and
selecting, at the communication device, a portion of the locally stored content to be displayed on the ticker.

19. The method as recited in claim 18, wherein selecting the portion of the locally stored content is performed based on user preferences.

20. The method as recited in claim 18, wherein selecting the portion of the locally stored content is performed using a scheduling system associated with the ticker of the communication device.

21. The method as recited in claim 17, wherein the content is aggregated prior to being received by the communication device.

22. The method as recited in claim 17, wherein selection of the particular transmission mode is based in part on a location of the communication device.

23. The method as recited in claim 17, wherein the content comprises location-based content that is selected to correspond to a geographic location of the communication device.

24. The method as recited in claim 22, farther comprising:
storing the content in a local data store at the communication device; and
based on the geographic location of the communication device, selecting the location-based content from the content stored in the local data store in preparation for displaying the location-based content on the ticker.

25. The method as recited in claim 17, wherein presenting the content comprises a notification on the ticker of an email message sent to an email address associated with the communication device.

26. The method as recited in claim 17, wherein presenting the content at the communication device comprises displaying the content at the communication device.

27. The method as recited in claim 17, wherein the content comprises at least one of audio, video, graphics, and text.

28. The method as recited in claim 17, further comprising, at the communication device, selecting the content to be displayed on the ticker based on scores assigned to the content and scores assigned to other content available to the communication device, wherein the scores specify at least one of the timing, order and frequency of display of the content.

* * * * *

UNITED STATES PATENT AND TRADEMARK OFFICE
CERTIFICATE OF CORRECTION

PATENT NO. : 7,370,283 B2
APPLICATION NO. : 11/061422
DATED : May 6, 2008
INVENTOR(S) : Konstantin Othmer It is certified that error appears in the above-identified patent and that said Letters Patent is hereby corrected as shown below:

On the Title Page 2
Under Other Publications, Item 6, change "SCE Stuents" to --SCE Students--

Drawings
Add a --400-- label that refers to the entire process

Column 2
Line 67, change "itransmission" to --transmission--

Column 23
Line 23, change "farther" to --further--

Column 24
Line 11, change "22, farther" to --20, further--

Signed and Sealed this

Twenty-eighth Day of April, 2009

JOHN DOLL
*Acting Director of the United States Patent and Trademark Office*